United States Patent
Wells et al.

(10) Patent No.: US 12,399,470 B2
(45) Date of Patent: Aug. 26, 2025

(54) UNIVERSAL POWER DATA EXCHANGE (UPDE) FOR ELECTRICAL POWER GRID

(71) Applicant: PXiSE Energy Solutions, LLC, San Diego, CA (US)

(72) Inventors: Charles H. Wells, San Diego, CA (US); Raymond A. de Callafon, San Diego, CA (US); Patrick T. Lee, San Diego, CA (US); Aditya Mishra, San Diego, CA (US)

(73) Assignee: PXiSE Energy Solutions, LLC, San Diego, CA (US)

( * ) Notice: Subject to any disclaimer, the term of this patent is extended or adjusted under 35 U.S.C. 154(b) by 0 days.

(21) Appl. No.: 18/907,523

(22) Filed: Oct. 5, 2024

(65) Prior Publication Data

US 2025/0116977 A1    Apr. 10, 2025

Related U.S. Application Data

(60) Provisional application No. 63/542,987, filed on Oct. 6, 2023.

(51) Int. Cl.
*G05B 13/04*     (2006.01)
*H02J 13/00*     (2006.01)
*H04L 67/12*     (2022.01)

(52) U.S. Cl.
CPC ...... *G05B 13/042* (2013.01); *H02J 13/00001* (2020.01); *H02J 13/00002* (2020.01); *H02J 13/00006* (2020.01); *H04L 67/12* (2013.01)

(58) Field of Classification Search
CPC .............. G05B 13/042; H02J 13/00001; H02J 13/00002; H02J 13/00006; H04L 67/12
See application file for complete search history.

(56) References Cited

U.S. PATENT DOCUMENTS 9,252,915 B1   2/2016  Bakken
9,985,860 B2   5/2018  Zweigle et al.
(Continued)

OTHER PUBLICATIONS

Neumann et al., "Universal Utility Data Exchange (UUDEX)-Workflow Design-Rev 1" Cybersecurity of Energy Delivery Systems Research and Development. U.S. Department of Energy. Retrieved from https://www.pnnl.gov/main/publications/external/technical_reports/PNNL-32391. 46 pages, dated Dec. 2021.
(Continued)

*Primary Examiner* — Ziaul Karim
(74) *Attorney, Agent, or Firm* — Gray Ice Higdon

(57) ABSTRACT

Systems and methods that enable secure, low latency, and reliable one-to-many and/or many-to-many communications between various endpoints associated with an electrical power grid. The endpoints can include, for example, physical sensors coupled to the electrical power grid, controllable resources of the electrical power grid (e.g., battery storage units, solar generation curtailment, wind generation curtailment, EV charging systems, and/or HVAC systems), controllers that each control one or more of the controllable resources of the electrical power grid, HMIs that enable human monitoring and/or human controlling of the electrical power grid, data historian(s) that enable persistent storage of various electrical power grid data (e.g., measurements, control parameters, conditions, etc.), and/or other endpoint(s).

30 Claims, 9 Drawing Sheets

(56) References Cited

U.S. PATENT DOCUMENTS

| | | | |
|---|---|---|---|
| 2012/0082048 A1 | 4/2012 | Taft et al. | |
| 2012/0310559 A1* | 12/2012 | Taft | H02J 13/00002 |
| | | | 702/62 |
| 2013/0120105 A1* | 5/2013 | Bhageria | H02J 13/00034 |
| | | | 340/3.1 |
| 2013/0124001 A1 | 5/2013 | Bhageria et al. | |
| 2014/0039965 A1* | 2/2014 | Steven | G06Q 10/06315 |
| | | | 705/7.25 |
| 2015/0278968 A1* | 10/2015 | Steven | G06Q 50/06 |
| | | | 705/7.35 |
| 2016/0270052 A1* | 9/2016 | Dame | H01Q 1/521 |
| 2017/0346291 A1 | 11/2017 | Wells et al. | |
| 2019/0041845 A1* | 2/2019 | Cella | G05B 23/0291 |
| 2022/0123849 A1* | 4/2022 | McCall | H04J 3/0658 |
| 2022/0345417 A1* | 10/2022 | Kasichainula | H04L 47/30 |

OTHER PUBLICATIONS

International Search Report and Written Opinion issued for Application No. PCT/US2024/050147, 13 pages, dated Dec. 17, 2024.

* cited by examiner

UNIVERSAL POWER DATA EXCHANGE (UPDE) FOR ELECTRICAL POWER GRID

BACKGROUND

Modbus and the Distributed Network Protocol (DNP3) are two data communication protocols that are often used in the electric industry.

Modbus can run over various communication media, including twisted pair wires, wireless, fiber optics, and ethernet. Modbus operates on a primary-secondary system, where the primary device communicates with one or multiple secondary devices. Modbus has become a de facto standard, supported by most industrial instrumentation and automation equipment vendors. In the power industry, Modbus is utilized for connecting industrial devices that need to communicate with other automation equipment, including in applications in renewable energy sources like wind, solar, geothermal, and hydropower.

DNP3 is designed for remote telemetry and is mainly used in power industry applications. Before DNP3, devices such as remote terminal units (RTUs) and intelligent electronic devices (IEDs) could only use a serial interface for communication. DNP3 brought significant improvements, including reduced data transmission costs and enhanced communication capabilities. DNP3 is now utilized by utilities in thousands of substations and pole-top applications worldwide, providing open standards-based interoperability between substation computers, RTUs, IEDs, and master stations.

Both Modbus and DNP3 have facilitated the evolution of communication within the power industry, enabling better control, monitoring, and integration of various systems and devices.

In a Modbus connection, the primary device is typically a single device, such as a computer or a programmable logic controller (PLC), or a SCADA system that initiates communication. The primary device sends requests to the secondary device(s), which are the device(s) on the network that respond to the primary device's requests. Secondary device(s) can be sensors, actuaries, or any other devices that collect data or perform actions. Each secondary device has a unique address, and when the primary device sends a request to a specific address, only the secondary device with that specific address receives that request. With Modbus, the primary device can write data to the secondary device(s) or read data from secondary devices, but secondary devices do not communicate with each other and only react to requests from the primary device.

One drawback with Modbus and DNP3 is that both require a primary-secondary relationship and there can generally be only a single primary device. Further, each secondary device can only communicate with one primary device. This point-to-point communication requirement can prevent sharing of information between disparate endpoints that may need the same data. For example, the point-to-point communication requirement can prevent providing of data from a secondary device to more than a single primary device or, more generally, can prevent providing of data from a secondary device to multiple additional devices. Another drawback with Modbus and DNP3 is that their use is often restricted to local and private networks due to data security concern and latency of communication.

These and/or other drawbacks can be exacerbated in control and monitoring of electric power systems. For example, the problems can be significant in a large power grid with hundreds, thousands, or tens of thousands of grid components that are geographically distributed over a large area-such as where controllers are miles away from controllable resource(s) and/or sensor(s) or are being hosted in the cloud.

For instance, a large power grid can include hundreds or thousands of Phasor Measurement Units (PMUs) and other sensors it can be advantageous to share data from each of those PMUs and other sensors with multiple corresponding additional devices (e.g., a corresponding controller, a corresponding human machine interface (HMI), and/or a corresponding historian). However, current Modbus and DNP3 implementations are limited to point-to-point data communication and/or can require introduction of a large quantity of additional components and/or time-consuming installation and/or engineering that can be error prone (which can cause significant issues in power systems). Moreover, current Modbus and DNP3 implementations can introduce communication latency that is unacceptable to achieve subsecond device control when energy resources are widely distributed across a power network. Yet further, various electric power system hardware can be incapable of communicating with more than a single endpoint.

SUMMARY

Implementations disclosed herein provide systems and methods that enable secure, low latency, and reliable one-to-many and/or many-to-many communications between various endpoints associated with an electrical power grid. The endpoints can include, for example, physical sensors coupled to the electrical power grid, controllable resources of the electrical power grid (e.g., battery storage units, solar generation curtailment, wind generation curtailment, EV charging systems, and/or HVAC systems), controllers that each control one or more of the controllable resources of the electrical power grid, HMIs that enable human monitoring and/or human controlling of the electrical power grid, data historian(s) that enable persistent storage of various electrical power grid data (e.g., measurements, control parameters, conditions, etc.), and/or other endpoint(s).

As an example, assume a PMU that is installed at a Point Of Interconnection (POI) of the electrical power grid and that is generating PMU measurements for the POI. For example, the PMU can measure frequency, voltage, and current at the POI and publish these as phasor data PMU measurements. With prior techniques, the PMU will have a point-to-point connection to only a single primary controller and will transmit the PMU measurements to only the single primary controller via the point-to-point connection. However, implementations disclosed herein enable the PMU to transmit (e.g., via a gateway associated therewith and in accordance with a streaming protocol) a stream of sensor data to universal power data exchange (UPDE) system, and the UPDE system can transmit (e.g., in accordance with the streaming protocol) the PMU measurements to each of multiple endpoints that have previously subscribed to the stream of sensor data. For example, the multiple endpoints can include a power controller, an HMI, a data historian, and/or other endpoint(s). Continuing with the example, the power controller can generate, based on the PMU measurements and data from other endpoint(s) (e.g., an HMI), control parameter(s) for a controllable resource of the electrical power grid. The power controller can transmit (e.g., via a gateway associated therewith and in accordance with a streaming protocol) the control parameter(s) to the UPDE system, and the UPDE system can transmit (e.g., in accordance with the streaming protocol) the control parameter(s)

to each of multiple endpoints that have previously subscribed to the control parameter(s). For example, the multiple endpoints can include the controllable resource (which will be controlled in accordance with the control parameter(s)), a data historian, and/or other endpoint(s).

In various implementations, some or all data packets transmitted to or from the UPDE system utilizing the streaming protocol include synchronized timestamps (e.g., synchronized to a Global Positioning System (GPS) clock or to a standalone precision clock such as the precision time protocol grandmaster clock). In some of those implementations, each of the synchronized timestamps each corresponds to a corresponding measurement time. For example, data packets that reflect a sensor measurement can include a synchronized timestamp of that sensor measurement and a responsive control parameter, generated by a controller based on the sensor measurement, can likewise include the same synchronized timestamp. This can enable a controller and/or a controllable resource to utilize the synchronized timestamps in ensuring appropriate control of resources of the power grid.

As a non-limiting example, measurements from a controllable resource can be transmitted at 60 Hz and responsive control parameters, generated by a controller based on the measurements, can be received at the controllable resource at 60 Hz. Synchronized timestamps can be included with the measurements and with the control parameters. For example, a first measurement can have a first timestamp and a first control parameter generated based on the first measurement can have the first timestamp, a second measurement can have a second timestamp and a second control parameter generated based on the second measurement can have the second timestamp, etc.

Utilization of the synchronized timestamps can enable a controller (or other endpoint) to process received measurements in accordance with a time they were measured as opposed to a time they are received by the controller (or other endpoint)—as receipt time of measurements can be milliseconds later than their measurement time and/or can be out of order relative to their measurement time (e.g., a later in time measurement received before an earlier in time measurement). Processing received measurements in accordance with the time they were measured enables a controller to, for example: ensure generated control parameters (e.g., feedback based) are generated based on an appropriately ordered sequence of measurements (e.g., ensure that an earlier in time measurement is utilized in generating control parameter(s) prior to utilization of a later in time measurement); temporally align measurements from a first resource with received measurements from separate resource(s) and generate control parameter(s) based on such alignment (e.g., generate control parameter(s) for an automatically controllable resource based on two or more separately received measurements); determine (e.g., based on a determined time delay) which earlier transmitted control parameter(s) are influencing measurements that are currently being processed; etc.

Likewise, utilization of the synchronized timestamps, for measurements, along with the control parameters can enable a child controller and/or a controllable resource to process received control parameters in accordance with measurement times to which they correspond as opposed to a time they are received. Processing control parameters in accordance with the measurement times to which they correspond enables a child controller and/or controllable resource to, for example: ensure control parameters are implemented in an appropriately ordered sequence (e.g., ensure that a control parameter corresponding to an earlier in time measurement is implemented prior to implementation of a control parameter corresponding to a later in time measurement); determine a current time delay based on a difference between a synchronized timestamp for a most recently received control parameter and a current synchronized timestamp; utilize the current time delay for providing with corresponding measurements to a parent controller for improved control by the parent controller; utilize the current time delay in determining whether to implement the control parameter (e.g., bypass implementing if the current time delay exceeds a threshold); etc.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
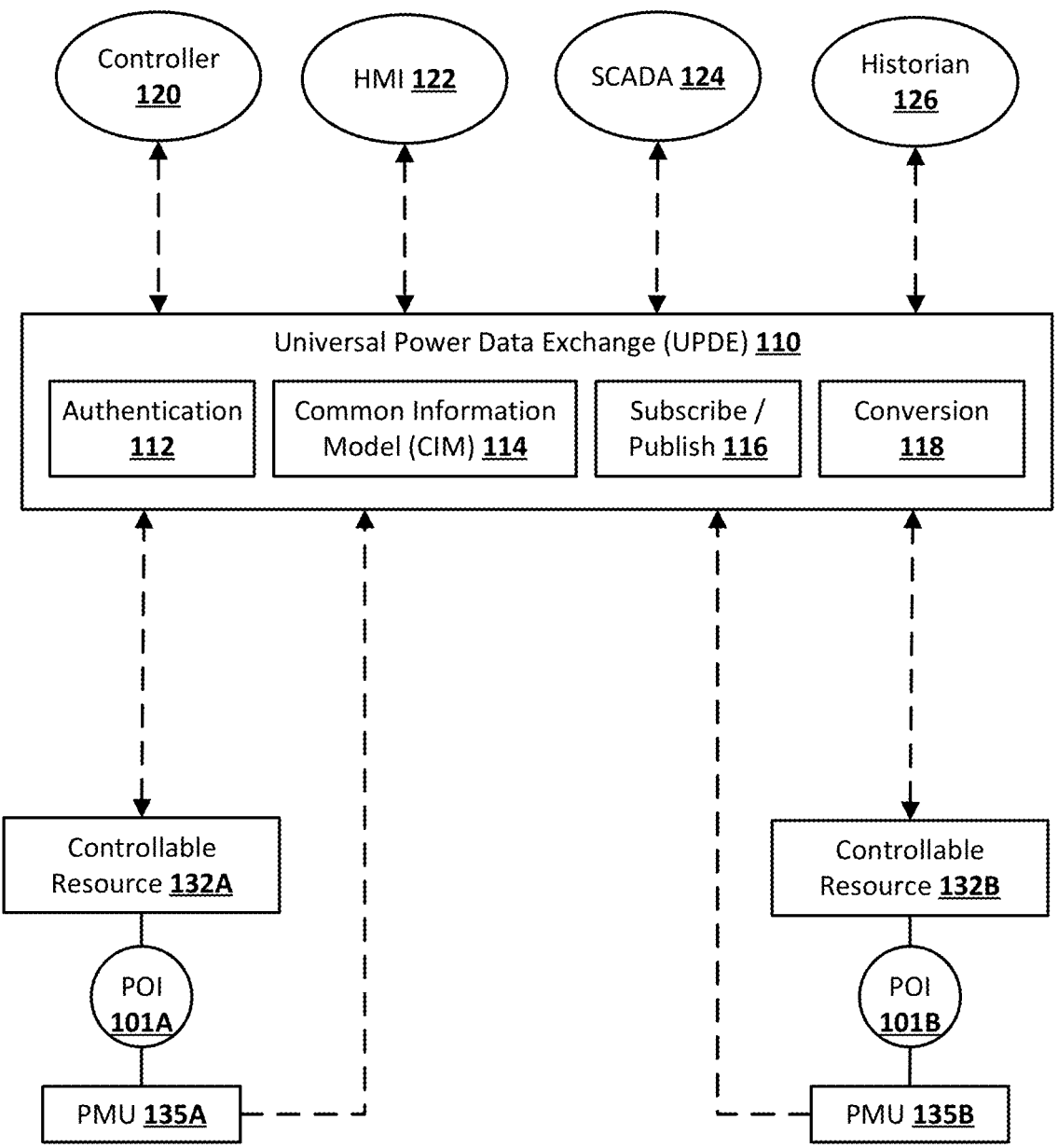
FIG. 1 schematically depicts an example universal power data exchange (UPDE) system and various endpoints that can interact with the UPDE system, in accordance with various implementations.

Prior to turning to the figures, a non-limiting overview of various implementations is provided.

Traditional data exchange methods used in real-time power system operations are achieved by mapping data from a sender (data publisher) to a receiver (data subscriber). The list of data registers mapped between the sender and receiver are often ambiguous and have to be discovered and configured to provide the unique device specific communication via an elaborate point list. Even the same device from the same manufacturer, acting as a sender, may have a different list of data registers according to the implementation and software version. In addition, most end devices acting as a sender are only capable of communicating to one receiver device. For example, in a standard TCP/IP Internet Protocol-based communication, only one external IP address can be mapped to exchange the data.

As such, real-time operational data sharing is difficult because many existing communication hardware can only support one data publisher and one data subscriber relationship. Given such limitation, information can only be shared among end devices if one of the devices can act as the data gateway with the ability to communicate with multiple IP addresses simultaneously. One example is a supervisory control and data acquisition (SCADA) system that can communicate with many end devices. When the number of data publishers and data subscribers increase in an environment that includes many different equipment provider specific communication designs, and using many different industrial communications protocols, the data exchange requires many unique point-to-point protocol-specific and communication design-specific interfaces. Such data exchange methods have been utilized in the electric industry, but require significant time and cost to implement, maintain, and update. Moreover, such methods can be prone to errors in configuration. An error in configuration in the electrical power grid environment can cause adverse impacts such as sub-optimal control, power fluctuation, brownouts, blackouts, and/or other undesired conditions with an electrical power grid. Furthermore, this customized data communication occurs with significant latency (e.g., two seconds or more, three seconds or more, or other latency) due to protocol overheads and lack of standardization. As result, the slow communication methods do not support fast control actions or decision making that would benefit from fast streaming data.

Implementations disclosed herein utilize Universal Power Data Exchange (UPDE) systems and/or methods to enable exchange of power system information and operating data needed for real-time monitoring and/or control of an electrical power grid. Some of those implementations enable, via the UPDE systems and/or methods, fast closed-loop control, fast setup, and/or low implementation and configuration costs. Some of those implementations additionally or alternatively enable real-time simultaneous data sharing between multiple data publishers and multiple data subscribers to support decentralized communication. In other words, implementations of the UPDE system and method disclosed herein enable real-time operating data to be shared instantly for other power system applications such as operational planning and maintenance.

Implementations of the UPDE systems and methods disclosed herein can utilize or incorporate a common semantic data model (e.g., a Common Information Model (CIM) or other common semantic data model), an authentication engine, a subscribe/publish engine, a conversion engine, a gateway, and/or other component(s). The components are utilized to connect sending endpoints, also described as data publishers, and receiving endpoints, also described as data subscribers. All endpoints are assigned a publisher role, a subscriber role, or both a publisher role and a subscriber role, depending on data streaming requirements.

The common semantic data model (e.g., CIM) can provide a standardized structure and naming convention for the devices used in the data exchange so that unique and time-consuming single publisher and single subscriber data mapping can be eliminated. The UPDE system can provide scalable data connectivity between many data publishers and data subscribers using the common data semantic model that also supports GPS time-stamped data. The gateway can exchange data with the end devices using a native industrial protocol, reformatting the data including the use of a streaming data protocol and exchanging the data with the UPDE system using the common data sematic model, providing secured communication, and high speed and sub-second closed-loop control performance.

As one example, a UPDE system can be used for data sharing in modular microgrid control systems. The UPDE system contains object data in a standard format, such as one that is approved by an International Standard Organization.

Data publishers write data securely to the UPDE system and subscribers read data securely from the UPDE system. Data can only be accessed with proper identity and authentication and certified credentials. The UPDE system supports multiple endpoints reading and writing data simultaneously at a high rate, such as 60 times per second rate or faster. The read and write data rate can optionally be determined according to subscriber and publisher requirements. Information on the UPDE system may be used by multiple subscribers simultaneously. Short term data history will be stored in a data queue on the UPDE system, thus allowing a subscriber to read not only the current real time data but also historical data. Each data item on the UPDE system can include: time stamp, value, and/or quality. Data items can be stored, for example, in RAM and/or ROM of the UPDE system.

The UPDE system can operate in redundant modes, where parallel service buses run either on a local hardware system or in a cloud environment.

The UPDE system can be setup for data exchange among devices within a microgrid and/or data exchange among microgrids and other power system facilities. For instance, the fast phasor data from a PMU from one microgrid, can be shared with peer or parent microgrids at a high data rate supported by a streaming protocol between the PMU and the UPDE system and between the UPDE system and the peer or parent microgrids.

When there is more than one UPDE system, the UPDE systems can be arranged in a hierarchy so that multiple hierarchical microgrids can be operated in clusters to control a large portion of the power grid. With the application of a streaming protocol, such as IEEE 2664, power devices located far away from one another in the network can be coordinated and controlled at sub-second data rate.

There can be multiple subscribers to the same data for use in different applications. For example, a subscriber can include a real-time controller, that reads, computes, and writes data to the bus. Additional or alternative subscribers can be provided such as operator human machine interface(s) (HMI(s)), data historians, analysis and reporting application(s), performance monitoring application(s), and/or optimizers and other energy management system (EMS) application(s) that can use the data in real time.

The UPDE system can enable simultaneous reads and writes to the same value that do not collide and maintain data integrity. For example, if a read is attempted while a write is being made to a value, the write can be completed before the read is allowed.

Implementations disclosed herein utilize one or more streaming protocols (e.g., IEEE 2664) to provide low latency time-synchronized data transfer to and from the UPDE system using a common semantic data model, thus providing effective one-to-many and many-to-many low latency time-synchronized data communication to achieve fast closed-loop control.

Implementations disclosed herein provide flexible, interoperable, and secure power grid applications to address drawbacks with existing approaches. Implementations enable easy integration of grid applications with sources of data and facilitate communication between them, making a significant contribution to the future of power grid management. Some of those implementations provide for extensibility, data separation, data sharing and export, real-time control and monitoring, scalability and performance, and/or security. Extensibility allows for easy integration of new and existing power grid applications developed in various programming languages. Data separation separates data sources from applications and offers a unified application programming interface (API) for access. Data sharing and export enables authorized users (e.g., authorized devices) to share data and events via integrated applications using a client API, web services, and/or a web socket API. Real-time control and monitoring supports subscription to secured and low latency streaming data and events. Scalability and performance enable scaling with increasing load while maintaining stable processing times even with an increasing number of clients. For security, implementations can use widely accepted tools such as the Java Authentication and Authorization Service (JAAS), Lightweight Directory Access Protocol (LDAP), and Transport Layer Security/ Secure Sockets Layer (SSL) to ensure communication security.

A non-limiting example is now described of configuring a high-speed feedback control application with sub-second streaming data input and closed-loop control. A PMU can be measuring at a POI of an electrical power grid and publishing, to a UPDE system, synchrophasor messages each including corresponding voltage, current, and frequency. The PMU can publish the synchrophasor messages to the UPDE system via a private LAN or public network (e.g., the Internet) and can utilize a streaming protocol such as IEEE 2664. For example, a synchrophasor message can be broken down into many pieces using a smart gateway capable of using a streaming protocol and the original synchrophasor message is reassembled at the UPDE system using the same streaming protocol. A controllable inverter-based resource (IBR) of the electrical power grid can be connected to the UPDE system via a private LAN or public network and publishing data to the UPDE system and subscribing to other data via the UPDE system.

Continuing with the non-limiting example, an objective can be for a controller to control, based on measurements from the PMU at the POI, the voltage in at least part of the electrical power grid by using the controllable IBR to inject reactive power into the grid so that the PMU readings match a desired setpoint, such as one that is input to the HMI by a human operator or one that is automatically determined (e.g., by a SCADA). The controller can be a software module running on a computer connected via a local LAN or public network that is connected to the UPDE system. Cyber security of the system can be configured by a local IT department that accesses the UPDE system via an HMI. This can include establishing two-factor authentication, establishing permissions, username and password, public keys, and/or digital signatures. This allows the controller and other endpoints to have secure access to the UPDE system.

The controller is designed to control voltage at the POI (location of the PMU) on the grid using the controllable IBR, optionally along with other controllable resource(s). The controller can interrogate the CIM on the UPDE system to identify the name of power signals to be used by the controller and discover the PMU readings from the PMU in the information model. For illustration purposes, the name of the PMU measurements, that are needed for reactive power control, can be "BusB.voltage.volt". The controller can also interrogate the CIM to identify the name of the CIM objects that represent the reactive power dispatch signal on the controllable IBR. For instance, the name of the reactive power dispatch signal could be "inverterBusB.reactivePower.dispatch.Var." The controller subscribes to PMU measurements, a setpoint signal, the dispatch signal to the controllable IBR and the state, real, and reactive power of the controllable IBR. Thus, the controller obtains, via the UPDE system, the value of the setpoint, the value of the output of the controllable IBR and the value of the controlled measurement point where the voltage must be controlled. An HMI can publish its reactive power setpoint to the UPDE system each time an operator changes the value. This value can additionally or alternatively be changed by a SCADA or other component.

The subscription to the voltage data "BusB.voltage.volt.setpoint" is delivered to the controller by the UPDE system since the controller has subscribed to the measured voltage at the control point on the UPDE system. The controller uses the subscribed voltage data to compute the reactive power dispatch signal to the controllable IBR and publishes the reactive power dispatch to the UPDE system. The controllable IBR is subscribing to the reactive power dispatch signal and receives the reactive power dispatch signal in real time and immediately changes its output reactive power in accordance with the reactive power dispatch signal. The controllable IBR resource publishes its changed output reactive power value to the UPDE system. The described process continues unless the controller is shut down.

Optionally, a second application, that is an event processor, can also subscribe to the PMU measurements, compute any anomalies, and publish the results on the UPDE system. Additionally, or alternatively, an HMI can subscribe to some of all of the described data and display the results. Additionally, or alternatively, a SCADA system can subscribe to all data and perform other calculations including publishing a new voltage setpoint for the controller.

In the non-limiting example, the following endpoints can interact with the UPDE system: a PMU, a controllable IBR, an HMI, a controller, a historian, a SCADA, an event processor, and a CIM database. A traditional point-to-point method requires sixty-four custom interfaces if each endpoint has to communicate with each of the other endpoints. Utilizing the UPDE system and other techniques disclosed herein requires only eight interfaces and each only needs to be setup only once (e.g., subscribe/publish to the UPDE system in CIM object format). This approach supports a large number of control and data analytics to be performed in real time with minimum configuration times and fewer errors.

As referenced above, some implementations disclosed herein receive and/or transmit data with sub-second latency over a public data network with multiple data communication paths, such as the Internet, and without any utilization of a virtual private network. For example, data can be transmitted from a sensor or a controller to an UPDE system, from an UPDE system to a controller or a data historian, etc. Some prior approaches, to achieve continuous sub-second feedback control between a system controller and input sensor(s) and controlled object(s), either require that local controllers be hard-wired and/or require a local area network (LAN) for fast data communications. In some of those prior approaches, very fast time-synchronized data such as phasor measurements are communicated to system controllers as input signals over a private LAN or through a virtual private network (VPN) over a public data network. In other words, the achievement of fast sub-second control of BESS and inverter-based resources by the system controller with such prior approaches is dependent on a dedicated low latency data communication system. However, using a LAN and/or a VPN over a public data network is not feasible when there is a large quantity of controllable resources that are widely geographically distributed in an electrical network (e.g., distributed across many miles). For example, it is costly and time-consuming to establish, configure, and maintain more than a few VPN services and is difficult to manage the cyber security of the control system.

There is an existing application of streaming synchrophasor messages for data storage using the IEEE 2664 streaming data protocol. The existing application includes components that provide data transmission one-way from the data source to the destination using the Internet.

One approach to communicating data over a public data network is to send data, from sensors, through a data handler to a receiver and then to a data historian for recordation of the sensor data. This is a one-way flow of information that is not used to make an immediate (e.g., sub-second) response. The information is generally contained in a long data message of information that is broken down into smaller packets for transmission over a public or private network. The reassembly of the long data message at the receiving end often results in errors due to missing or corrupted small packets and, hence, the entire long data message is lost. This results in data dropout where a percentage of valuable information is lost. The application of a data handler, using the IEEE 2664 streaming data protocol, to transmit long synchrophasor messages one-way has been practiced and has reduced data transmission errors for data acquisition from sensors.

Some implementations disclosed herein relate to using streaming protocol(s) over the Internet or other public network to achieve secure and fast communications between endpoints in a hierarchical manner that can be cascaded and scaled in multiple levels. More particularly, some of those implementations relate to the use of gateways with built-in streaming data protocol(s) to achieve secured, fast, low data dropout, communications. In some of those implementations, synchronized timestamps for measurement times are provided along with measurements and are provided along with control parameters determined based the measurements and enable controllers and/or controllable resources to utilize the synchronized timestamps in ensuring stable control of resources of the power grid.

Implementations of fast feedback control disclosed herein provide sub-second control of a large quantity of geographically dispersed and controllable devices, enable that control over a public data network, and includes components that transmit data bi-directionally through the public data network securely at a low latency. This can enable communications between a controller and controlled devices with communication performance comparable to a physical LAN, but without various drawbacks of a physical LAN and while enabling communications with geographically dispersed power grid resources.

The controller component can be, for example, hardware and/or software that can process input data from sensors and devices and provide output commands to the controlled devices.

The sensors can be, for example, capable of communicating messages using one or more data protocols. An example of a sensor is a protective relay used in a power system that is connected to a current transformer and a voltage transformer for measuring power system parameters. Examples of data protocols include C37.118 synchrophasor messages and Modbus data messages.

The controllable resources can be, for example, capable of sending messages using one or more data protocols to the system controller through a gateway and capable of receiving messages using one or more data protocols from the gateway to actuate power flow to and/or from the electric network. Some examples of a data protocol that can be used in end devices include Mobus, DNP3.0, IEEE 2030.5, and IEEE C37.118.

A gateway can send and receive messages in one or more data protocols and utilizes one or more streaming data protocols for data transmission through a public data network. The gateway uses one or more streaming data protocols to break down a long complete message from a sensor, controllable device, a UPDE system, or other endpoint to smaller data packets for sending through the public data network and/or to reassemble smaller data packets into a complete message before sending the complete message to a controller, controllable device, UPDE system, or other endpoint.

A non-limiting example of a streaming data protocol that can be used to achieve one or more of these requirements is described by the IEEE 2664 standard. The streaming data protocol that is described by the IEEE 2664 standard is an example of one data streaming protocol that can be used to process power system parameters such as C37.118 messages with secured communications over a public or private data network. The Internet is one example of a public data network where the sending and receiving of data occurs.

In view of these and/or other considerations, some implementations disclosed herein use, as a streaming data protocol the Streaming Telemetry Transport Protocol (STTP) protocol defined by IEEE 2664, and use the STTP protocol over a public network, such as the Internet. Instead of serializing an entire data structure as a unit, STTP is designed to package each of the distinct elements of the data structure into small groups. Serialization is managed for each data element, typically a primitive type, that gets individually identified along with any associated state such as time and/or quality information. With STTP more information is being sent, but it is being packaged differently. By sending the primitive measurement units directly instead of as a full structure, many advantages are realized.

To resolve issues with large frame impacts on IP based networks, a primary tenet of the STTP design strategy is to reduce fragmentation. As a result, STTP intentionally limits the number of data points that are grouped together to form a frame to ensure its size is optimized for transmission over an IP network with minimal fragmentation. Because each data point is uniquely identified, the elements that appear from one frame to another are not fixed, thereby allowing interleaving of data from multiple simultaneous data exchanges. This notion supports the delivery of arbitrary number of data structures where each can have a different publication interval.

For feedback control applications, two-way data flow is necessary. This is to allow the control system to receive real time data, compute the next control action, and then generate control instructions at the next data interval. In many applications the data rate will be greater than 1 Hz, such as at 50 or 60 Hz, to effectively control the system.

Implementations disclosed herein recognize that the STTP protocol can be utilized for high-speed feedback control applications over the Internet in various functions in the power grid.

Turning now to the Figures, FIG. 1 FIG. 1 schematically depicts an example universal power data exchange (UPDE) system 110 and various endpoints that can interact with the UPDE system 110. The endpoints include a controller 120, an HMI 122, a SCADA 124, a historian 126, a controllable resource 132A, a controllable resource 132B, a PMU 135A that takes measurements at POI 101A of an electrical power grid, and a PMU 135B that takes measurements at another POI 101B of the electrical power grid.

As described herein, each of the endpoints can be a subscriber, a publisher, or both a subscriber and publisher to the UPDE system 110. An endpoint that is a publisher can transmit to the UPDE system 110 (and optionally only to the UPDE system 110), certain data and can optionally transmit the certain data according to a streaming protocol as described herein. An endpoint, that is a publisher, can transmit data according to the streaming protocol or can interact with a gateway (not illustrated) that transmits data according to the streaming protocol. For example, PMU 135A can generate Modbus data and can include, or be communicatively coupled with, a gateway that transmits the Modbus data according to the streaming protocol. An endpoint that is a subscriber will receive, from the UPDE system 110, transmissions of data to which the endpoint has subscribed (e.g., as reflected in a subscription list maintained by the subscribe/publish engine 116). The transmissions can be pushed by the UPDE system 110 to the endpoint automatically or can be retrieved/pulled in response to corresponding requests from the endpoint.

UPDE system 110 can be implemented by one or more computing devices, such as by one or more server devices. UPDE system 110 is illustrated as including an authentication engine 112, a CIM engine 114, a subscribe/publish engine 116, and a conversion engine 118.

The authentication engine 112 can work in conjunction with the subscribe/publish engine 116 to ensure that requests to include endpoints as subscribers, publishers, or both, are authenticated. For example, the authentication engine 112 can utilize a username and password and/or multifactor authentication to ensure that interactions with subscribe/publish engine 116 are authenticated. This can prevent nefarious actors from attempting to subscribe to and/or publish nefarious data.

The subscribe/publish engine 116 can receive requests for endpoints to publish data and/or subscribe to data and can create corresponding records reflecting data, the corresponding endpoint that is publishing the data, and the corresponding endpoint(s) that are subscribing to the data. These records can thereafter be utilized by the UPDE system 110 in receiving and/or transmitting data. The subscribe/publish engine 116 can work in conjunction with the CIM engine 114 to assign, according to the CIM, aliases to a publishing endpoint and/or to the published data that is published by the publishing endpoint. The subscribe/publish engine 116 can work in conjunction with the CIM engine 114 to enable discovery of data to which a subscribing endpoint can subscribe and/or to assign, according to the CIM, an alias to the subscribing endpoint.

The conversion engine 118 is optional and can, for example, convert data, that is received from a publishing endpoint, from one format to another format or from one unit of measure to another unity of measure, before transmitting the converted data to one or more subscribing endpoints. For example, the conversion engine 118 can convert PMU measurements that are received in float format to integer format. As another example, the conversion engine 118 can convert PMU or other measurements that are received in integer format to float format.

Turning now to FIGS. 2A-2H, various examples of one-to-many endpoint communications that can be achieved via the UPDE system 110 are described.

Figure 2A:
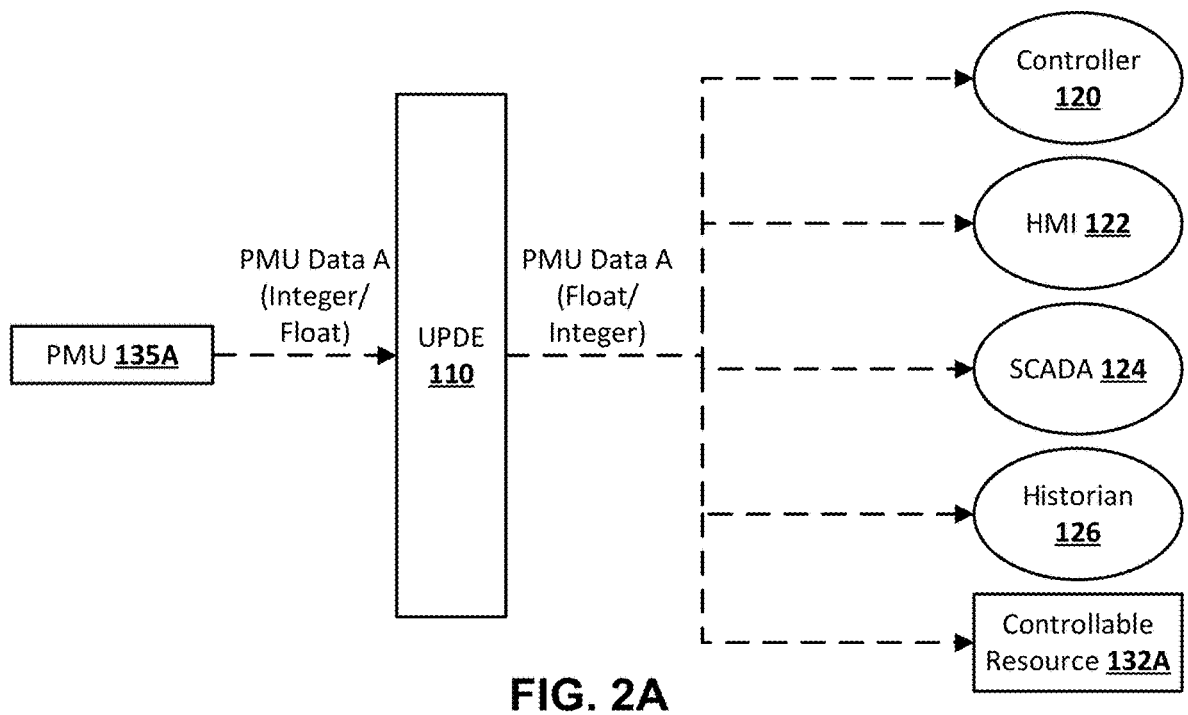
FIGS. 2A, 2B, 2C, 2D, 2E, 2F, 2G, and 2H depict examples of one-to-many endpoint communications that can be achieved via a UPDE system in accordance with various implementations.

In FIG. 2A, PMU 135A can be a publisher only endpoint and can continuously publish a stream of PMU data A (e.g., in integer format) to UPDE system 110. Subscriber data, maintained by subscriber/publisher engine 116 can indicate that controller 120, HMI 122, SCADA 124, historian 126, and controllable resource 132A as subscribers to the stream of PMU data A. Based on the subscriber data, UPDE system 110 can transmit, to each of the subscribing endpoints, the stream of PMU data A (optionally in a float format as converted by conversion engine 118).

Figure 2B:
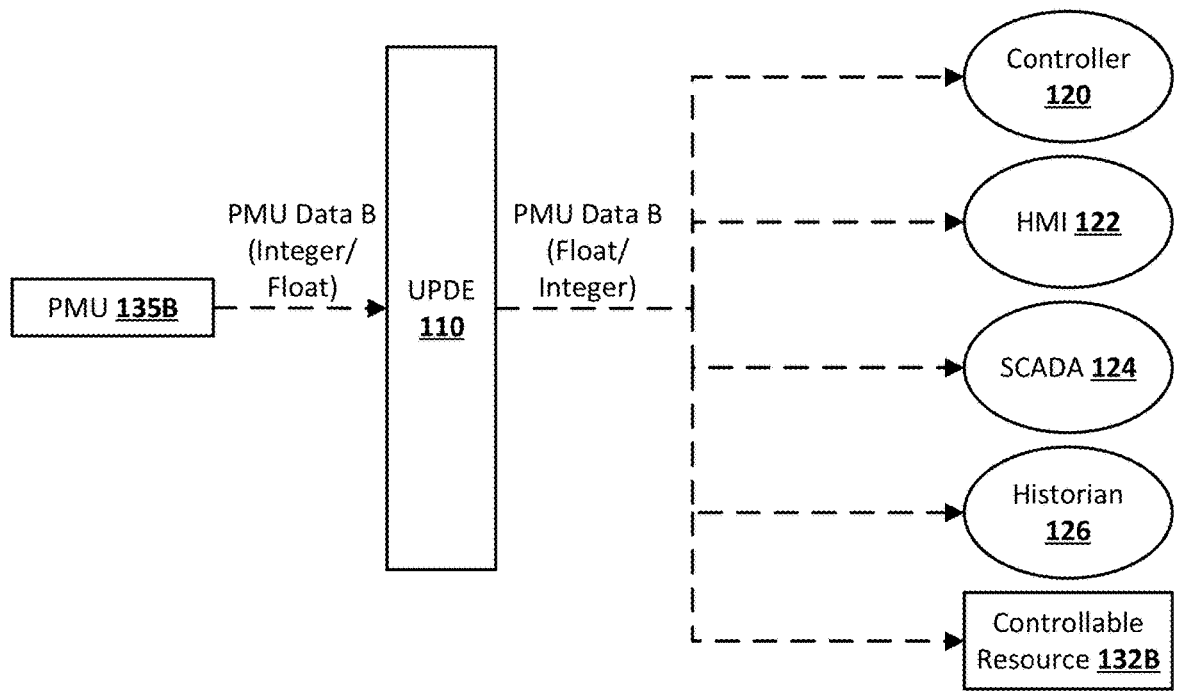

In FIG. 2B, PMU 135B can be a publisher only endpoint and can continuously publish a stream of PMU data B (e.g., in integer format) to UPDE system 110. Subscriber data, maintained by subscriber/publisher engine 116 can indicate that controller 120, HMI 122, SCADA 124, historian 126, and controllable resource 132B as subscribers to the stream of PMU data B. Based on the subscriber data, UPDE system 110 can transmit, to each of the subscribing endpoints, the stream of PMU data B (optionally in a float format as converted by conversion engine 118).

Figure 2C:
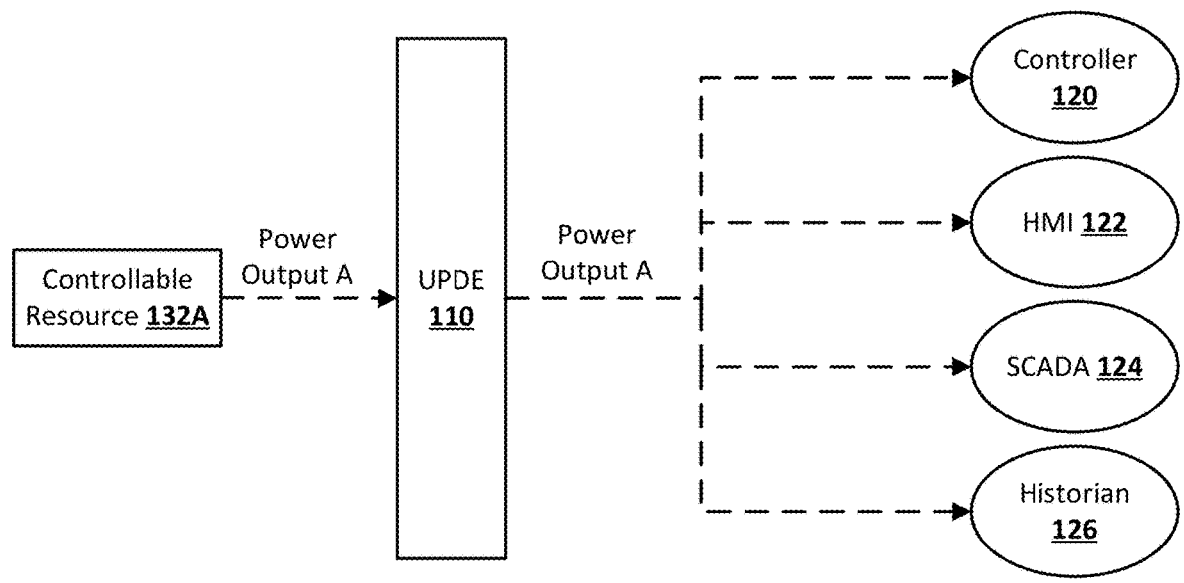

In FIG. 2C, controllable resource 132A, which is a publisher and subscriber (see e.g., FIG. 2A) endpoint can at least selectively publish its current power output A to UPDE system 110. For example, controllable resource 132A can be controllable IBR and the current power output A can reflect the current reactive power (if any) that is being provided by the controllable resource 132A to the electric power grid. Subscriber data, maintained by subscriber/publisher engine 116 can indicate that controller 120, HMI 122, SCADA 124, and historian 126 as subscribers to the current power output A. Based on the subscriber data, UPDE system 110 can transmit, to each of the subscribing endpoints, the current power output A.

Figure 2D:
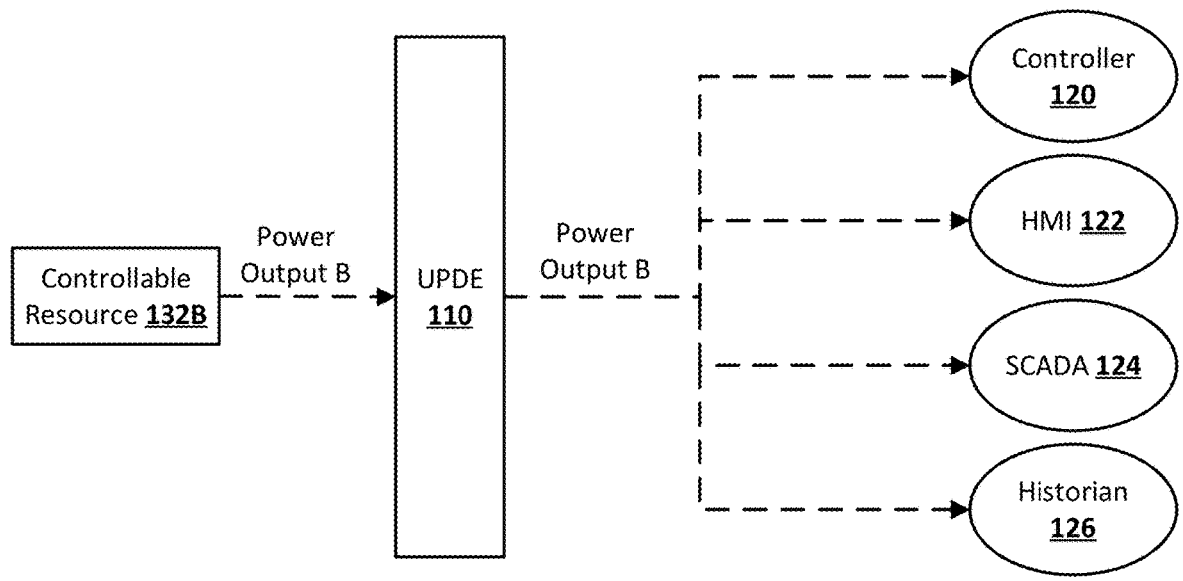

In FIG. 2D, controllable resource 132B, which is a publisher and subscriber (see e.g., FIG. 2B) endpoint can at least selectively publish its current power output B to UPDE system 110. For example, controllable resource 132B can be controllable IBR and the current power output B can reflect the current reactive power (if any) that is being provided by the controllable resource 132B to the electric power grid. Subscriber data, maintained by subscriber/publisher engine 116 can indicate that controller 120, HMI 122, SCADA 124, and historian 126 as subscribers to the current power output B. Based on the subscriber data, UPDE system 110 can transmit, to each of the subscribing endpoints, the current power output B.

Figure 2E:
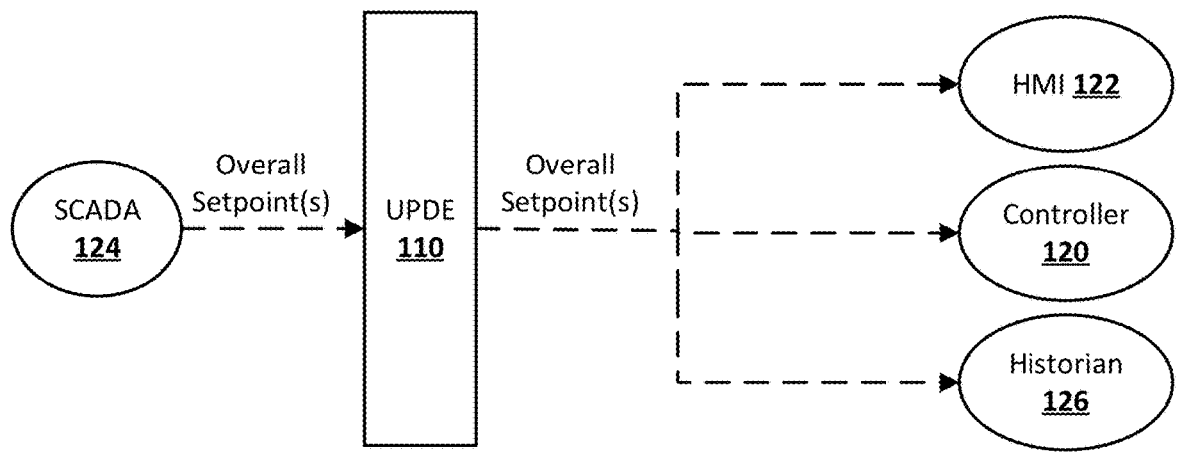

In FIG. 2E, SCADA 124, which is a publisher and subscriber (see e.g., FIG. 2A) endpoint can at least selectively publish overall setpoint(s) to UPDE system 110. For example, SCADA 124 can publish an overall setpoint based on analysis of historical and/or current data to which it subscribes. Subscriber data, maintained by subscriber/publisher engine 116 can indicate that controller 120, HMI 122, and historian 126 as subscribers to the overall setpoint(s). Based on the subscriber data, UPDE system 110 can transmit, to each of the subscribing endpoints, the overall setpoint(s).

Figure 2F:
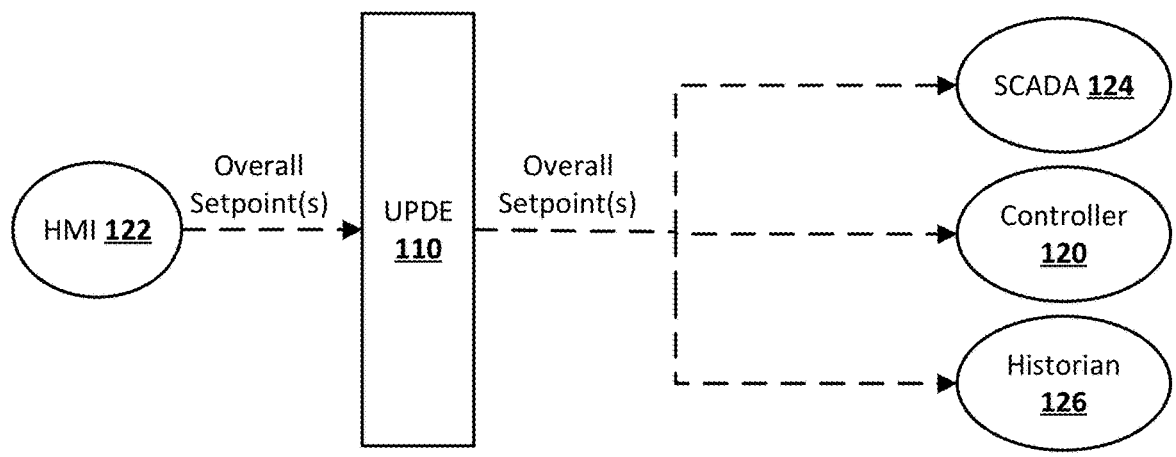

In FIG. 2F, HMI 122, which is a publisher and subscriber (see e.g., FIG. 2A) endpoint can at least selectively publish overall setpoint(s) to UPDE system 110. For example, HMI 122 can publish an overall setpoint (e.g., that at least temporarily overrides any setpoint from SCADA 124) in response to human input, via the HMI 122, that specifies the overall setpoint. Subscriber data, maintained by subscriber/publisher engine 116 can indicate that controller 120, SCADA 124, and historian 126 as subscribers to the overall setpoint(s). Based on the subscriber data, UPDE system 110 can transmit, to each of the subscribing endpoints, the overall setpoint(s).

Figure 2G:
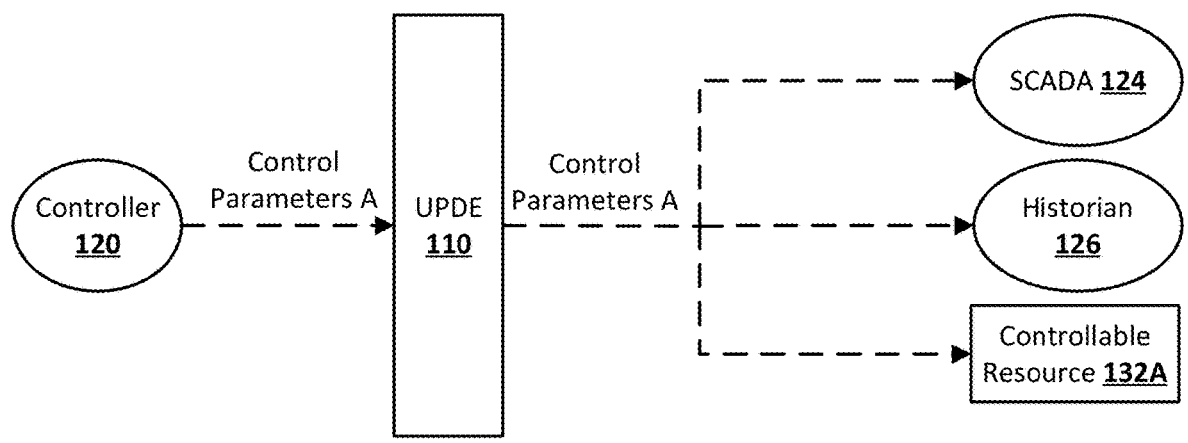

In FIG. 2G, controller 120, which is a publisher and subscriber (see e.g., FIG. 2A) endpoint can at least selectively provide control parameters A to UPDE system 110. For example, controller 120 can determine control parameters A based on PMU data A (received in FIG. 2A), power output A (received in FIG. 2C), and overall setpoint(s) (received in FIG. 2E or 2F). The control parameters A can include one or more signals or setpoints that, when provided to controllable resource 132A, cause corresponding adjustment of controllable resource 132A. For example, the control parameters A can include a power setpoint, a voltage setpoint, a frequency setpoint, an angle setpoint, a real and reactive power dispatch signal, and/or other parameter(s). Subscriber data, maintained by subscriber/publisher engine 116 can indicate that controllable resource 132A, SCADA 124, and historian 126 as subscribers to the control parameters A. Based on the subscriber data, UPDE system 110 can transmit, to each of the subscribing endpoints, the overall setpoint(s). It is noted that transmitting the control parameters A to the controllable resource 132A causes corresponding adjustment of controllable resource 132A (i.e., the controllable resource 132A acts based on the control parameters A).

Figure 2H:
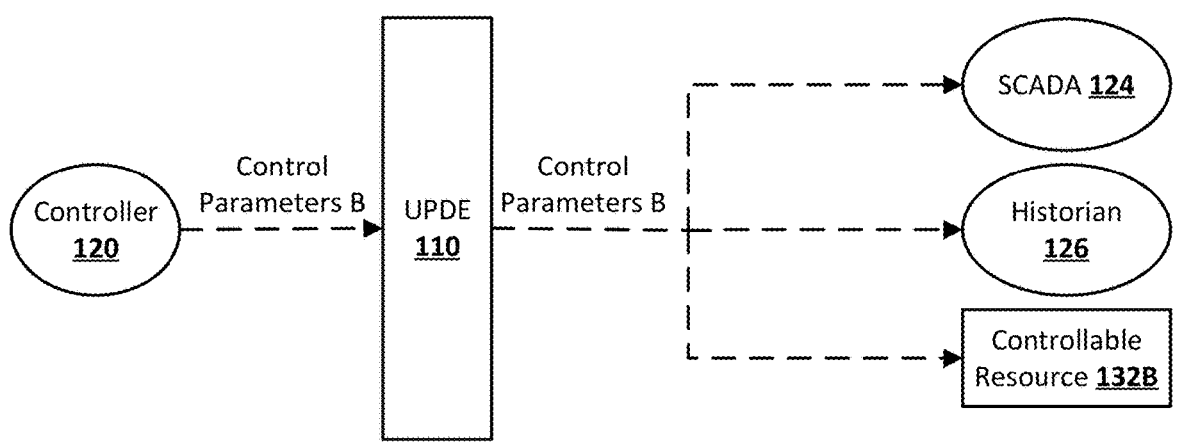

In FIG. 2H, controller 120, which is a publisher and subscriber (see e.g., FIG. 2B) endpoint can at least selectively provide control parameters B to UPDE system 110. For example, controller 120 can determine control parameters B based on PMU data B (received in FIG. 2B), power output B (received in FIG. 2D), and overall setpoint(s) (received in FIG. 2E or 2F). The control parameters B can include one or more signals or setpoints that, when provided to controllable resource 132B, cause corresponding adjustment of controllable resource 132B. Subscriber data, maintained by subscriber/publisher engine 116 can indicate that controllable resource 132B, SCADA 124, and historian 126 as subscribers to the control parameters B. Based on the subscriber data, UPDE system 110 can transmit, to each of the subscribing endpoints, the overall setpoint(s). It is noted that transmitting the control parameters B to the controllable resource 132B causes corresponding adjustment of controllable resource 132B.

It is noted that in FIG. 1 and in FIGS. 2A-2H communications between UPDE system 110 and endpoints can be via one or more networks such as a public communication network (e.g., the Internet). Moreover, some of all of the communications can be in accordance with a communications protocol such as STTP described herein.

The controllable resource 132A and/or the controllable resource 132B can include one or more controllable generators, one or more controllable batteries, one or more real or virtual microgrids, an EV charging system, a thermostat, and/or other controllable resource(s).

Figure 3:
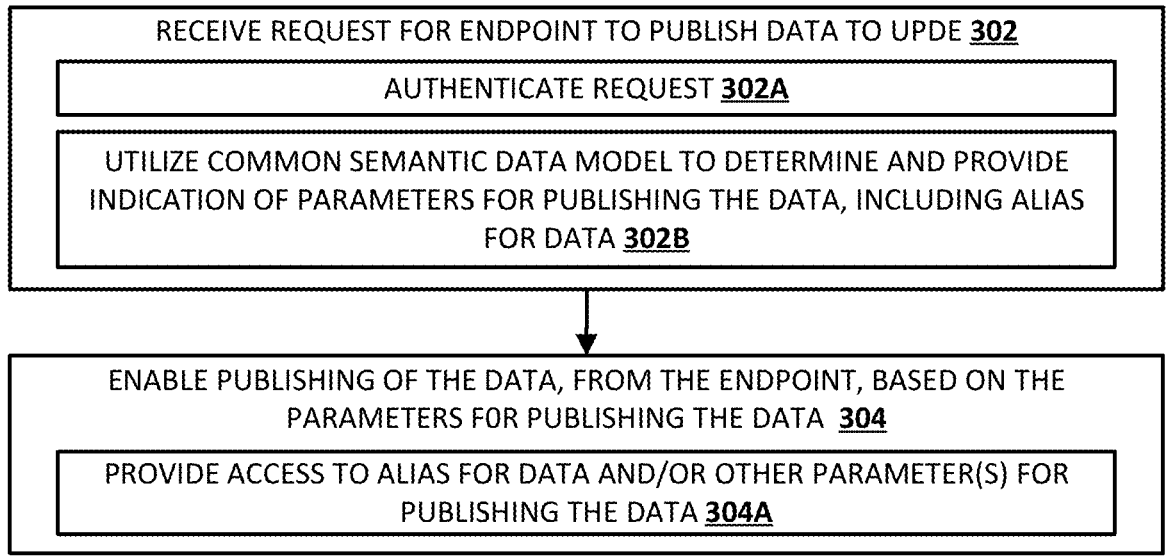
FIG. 3 illustrates an example method of configuring an endpoint for publication and/or subscription via a UPDE system.
Figure 3:
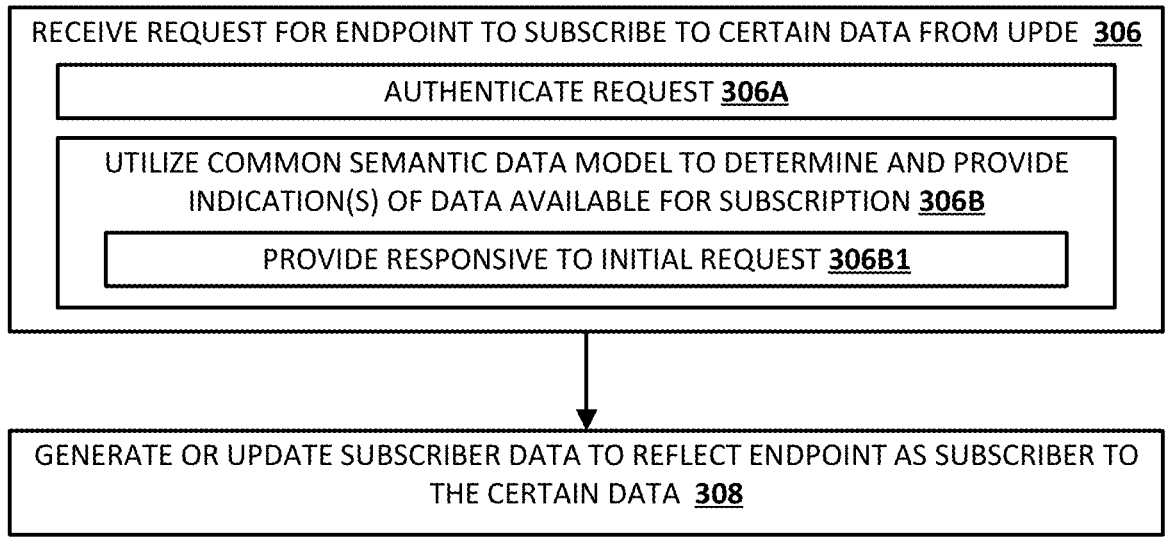

FIG. 3 illustrates an example method 300 of configuring an endpoint for publication and/or subscription via a UPDE system. For convenience, the operations of the flow chart are described with reference to a system that performs the operations. This system can include various components of various computer systems, such as one or more processor(s) of UPDE system 110 (e.g., processor(s) implementing authentication engine 112, CIM engine 114, and/or subscribe/publish engine 116). Moreover, while operations of method 300 are shown in a particular order, this is not meant to be limiting. One or more operations can be reordered, omitted, or added.

At block 302, the system receives a request for an endpoint to publish data to a UPDE system. For example, the request can be submitted by the endpoint and/or by a device that is distinct from the endpoint, such as a client device (e.g., a desktop computer, laptop computer, HMI, etc.). The request can, for example, identify the endpoint (e.g., an alias and/or IP address thereof). Block 302 can include sub-block 302A and/or sub-block 302B.

At sub-block 302A, the system authenticates the request. For example, the system can only receive and/or process the request if it is provided following a username and password authentication, a multifactor authentication, and/or other authentication(s).

At sub-block 302B, the system utilize a common semantic data model (e.g., CIM) to determine and provide an indication of parameters to be utilized for publishing the data, including an alias for the data. For example, the system can utilize a CIM to determine an alias for the data and can provide, to the requesting entity, an alias for the data to enable the endpoint to transmit the data along with the alias.

At block 304, the system enables publishing of the data, from the endpoint, based on the determined parameters for publishing the data. For example, the system can allow receipt, at a UPDE system of communications from the endpoint by whitelisting communications from an alias, IP address, or other identifier of the endpoint (e.g., one included in the request of block 302). Block 304 optionally includes sub-block 304A.

At sub-block 304A, the system provides access to an alias for the data (block 302B) and/or provides access to other parameter(s) for publishing the data. Providing such access can facilitate subscription to the data (e.g., in blocks 306 and 308).

At block 306, the system receives a request for an endpoint to subscribe to certain data from a UPDE system. For example, the request can be submitted by the endpoint and/or by a device that is distinct from the endpoint, such as a client device (e.g., a desktop computer, laptop computer, HMI, etc.). The request can, for example, identify the endpoint (e.g., an alias and/or IP address thereof). Block 306 can include sub-block 306A and/or sub-block 306B.

At sub-block 306A, the system authenticates the request. For example, the system can only receive and/or process the request if it is provided following a username and password authentication, a multifactor authentication, and/or other authentication(s).

At sub-block 306B, the system utilize a common semantic data model (e.g., CIM) to determine and provide indication(s) of data that are available for subscription. For example, the system can utilize a CIM to determine aliases for various data that is available for subscription and can match an alias, for one of those, to desired data indicated by the request and, in response, determine to subscribe to such data. Put another way, the request can directly indicate an alias or other identifier of the data to which the endpoint is to subscribe. As another example, at further sub-block 306B1, the system can provide, to the requesting entity and responsive to an initial request, multiple aliases for various data to enable selection (e.g., by a human via an interface) of the alias/aliases to which the endpoint is to subscribe. For instance, twenty possible aliases may match the initial request, can be provided responsive to the initial request, and a subset of those selected as the certain data to which the endpoint it to subscribe.

At block 308, the system generates or updates subscriber data to reflect the endpoint as a subscriber to the certain data determined at block 306. For example, the system can update subscriber data, for the certain data, to reflect an alias, IP address, or other identifier of the endpoint. Reflecting the endpoint as a subscriber to the certain data causes the UPDE system to thereafter transmit occurrences of the certain data to the endpoint.

Figure 4:
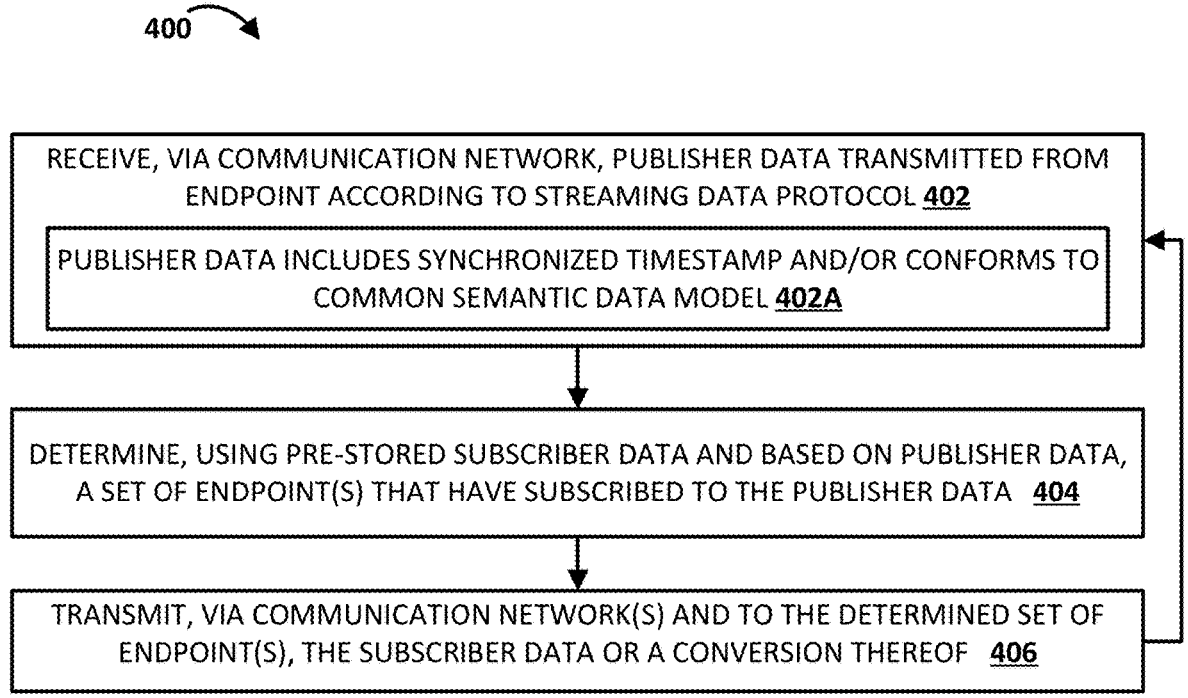
FIG. 4 illustrates an example method of performing one-to-many communications via a UPDE system in accordance with various implementations.

FIG. 4 illustrates an example method 400 of performing one-to-many communications via a UPDE system. For convenience, the operations of the flow chart are described with reference to a system that performs the operations. This system can include various components of various computer systems, such as one or more processor(s) of UPDE system 110. Moreover, while operations of method 400 are shown in a particular order, this is not meant to be limiting. One or more operations can be reordered, omitted, or added.

At block 402, the system receives, via a communication network, publisher data that is transmitted form an endpoint according to a streaming data protocol. Block 402 optionally includes sub-block 402A. At sub-block 402A, the publisher data includes a synchronized timestamp and/or conforms to a common semantic data model.

At block 404, the system determines, using pre-stored subscriber data (e.g., generated in block 308 of method 300) and based on publisher data (e.g., an alias and/or other property thereof), a set of endpoint(s) that have subscribed to the publisher data.

At block 406, the system transmits, via communication network(s) (e.g., the same and/or different ones as those in block 402), the subscriber data or a conversion thereof.

The system then returns to block 402 and performs another iteration of blocks 402, 404, and 406 based on further publisher data. Multiple instances of method 400 can be performed in parallel for multiple different types of data.

Figure 5:
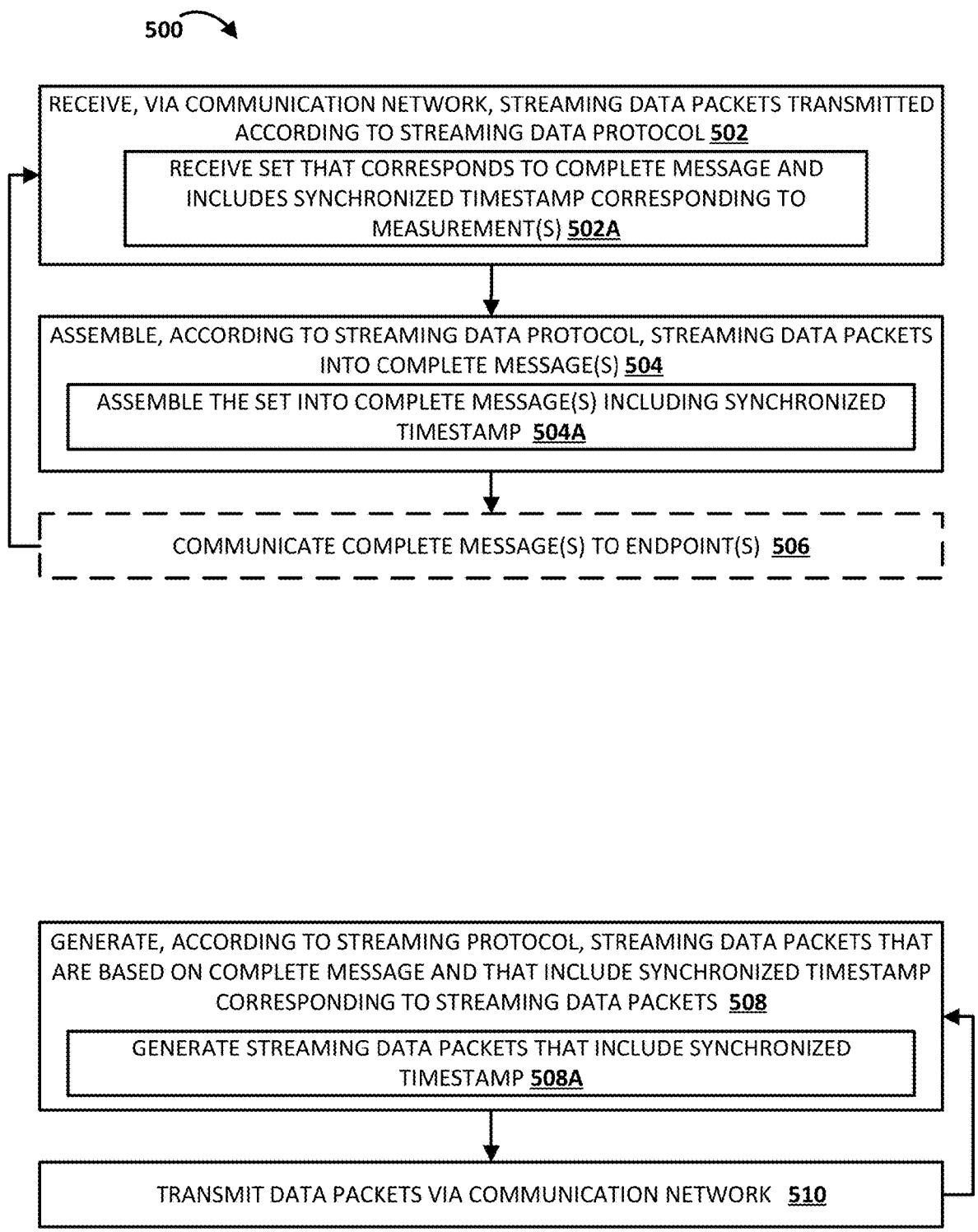
FIG. 5 illustrates an example method of assembling streaming data packets into complete messages and generating streaming data packets based on complete messages.

FIG. 5 is a flowchart illustrating an example method 500 of assembling streaming data packets into complete messages and generating streaming data packets based on complete messages. Method 500 can be performed by a UPDE system 110 described herein and/or by one or more endpoints described herein. For convenience, the operations of the flow chart are described with reference to a system that performs the operations. This system can include various components of various computer systems, such as by one or more processor(s). Moreover, while operations of method 00 are shown in a particular order, this is not meant to be limiting. One or more operations can be reordered, omitted, or added.

In method 500, blocks 502, 504, and 506 are illustrated as separate from blocks 508 and 510, and 512. It is noted that in various implementations iterations of blocks 502, 504, and 506 can occur in parallel with iterations of blocks 508 and 510. For example, the processing of data of blocks 502, 504, and 506 can continuously occur at a frequency (e.g., >1 Hz) while the processing of blocks 508 and 510 can also continuously occur, optionally at the same frequency.

At block 502, the system receives, via a communication network, streaming data packets transmitted according to a streaming data protocol. In some implementations, block 502 includes sub-block 502A, in which the system receives a set of inbound streaming data packets that corresponds to a complete message (e.g., one for real or estimated measurement(s) for a resource) and that includes a synchronized timestamp (e.g., GPS synchronized) corresponding to measurement(s) (e.g., one that reflects a time of the measurement(s)). For example, the complete message can be a real or estimated sensor measurement, such as a measurement from a real PMU at a POI of a power grid. Continuing with the example, the synchronized timestamp can be a time of the sensor measurement and can be included in the complete message and also included in the set of inbound streaming data packets. The synchronized timestamp can be included in the set of inbound streaming data packets as a result of being included in the complete message.

At block 504, the system assembles, according to a streaming data protocol and optionally a data format, streaming data packets received at block 502 into complete message(s). In some implementations, block 504 includes sub-block 504A in which the system assembles the set, optionally received in block 502A, into a complete message that includes the synchronized timestamp that is included in each of the inbound complete messages.

At optional block 506, the system communicates the complete message(s) to one or more endpoint(s). The system then proceeds back to block 502 to receive additional inbound streaming data packets. Iterations of blocks 502, 504, and 506 can occur continuously and at a high frequency (e.g., >30 Hz) to enable generation of a continuous and low-latency stream of inbound sensor data and/or other complete message(s). For example, iterations of blocks 502, 504, and 506 can be performed by an endpoint (e.g., controller, historian, SCADA, HMI) to enable generation of complete messages.

At block 508, the system generates, according to a streaming protocol and optionally according to a data format, streaming data packets that are based on a complete message. Block 508 can include sub-block 508A, in which the system includes a synchronized timestamp in the streaming data packets, such as one that corresponds to measurement(s). For example, a sensor, or a gateway associated therewith, can include a synchronized timestamp that corresponds to a time of measurement by the sensor.

At block 510, the system transmits the data packets, from block 508, via a communication network. For example, the system can transmit the data packets to a UDPE system.

The system then proceeds back to block 508 to generate additional streaming data packets based on an additional complete message. Iterations of blocks 508 and 510 can occur continuously and at a high frequency to enable a continuous and low-latency stream.

Figure 6:
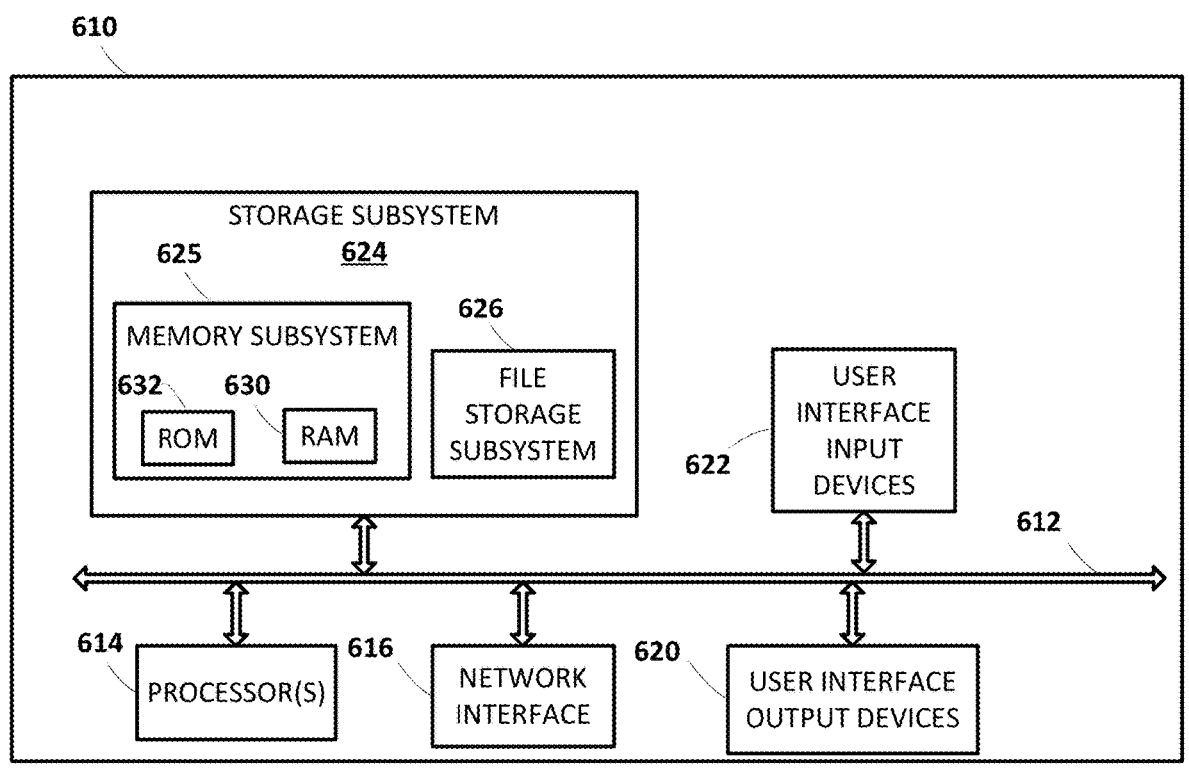
FIG. 6 schematically illustrates an example computer architecture on which selected aspects of the present disclosure can be implemented.

FIG. 6 is a block diagram of an example computing device 610 that can optionally be utilized to perform one or more aspects of techniques described herein. For example, all or aspects of computing device 610 can be incorporated in server(s) or other computing device(s) that are utilized to implement a virtual microgrid controller.

Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 can include the logic to perform selected aspects of the methods of FIGS. 4 and/or 5, as well as to implement various components depicted in the Figures.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem can use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes receiving, from a resource of an electrical power grid and via a communication network, a streaming power data measurement that includes a synchronized timestamp. The method further includes transmitting, via the communication network, the streaming power data measurement, or a conversion of the streaming power data measurement that includes the synchronized timestamp, to a first set of one or more endpoints. Transmitting the streaming power data measurement, or the conversion of the streaming power data measurement, is to the first set of one more endpoints based on first subscriber data reflecting that the first set of one or more endpoints have subscribed to streaming power data measurements from the resource. The first set of one or more endpoints include a power controller. The method further includes receiving, from the power controller and via the communication network, one or more control parameters generated by the power controller based on the streaming power data measurement, or the conversion of the streaming power data measurement. The one or more control parameters include the synchronized timestamp of the streaming power data measurement and include the synchronized timestamp based on being generated based on the streaming power data measurement or the conversion of the streaming power data measurement. The method further includes transmitting, via the communication network, the one or more control parameters, or a conversion of the one or more control parameters that include the synchronized timestamp, to a second set of one or more endpoints. Transmitting the one or more control parameters, or the conversion of the one or more control parameters, to the second set of one or more endpoints is based on second subscriber data reflecting that the second set of one or more endpoints have subscribed to control parameters generated by the power controller. Transmitting the one or more control parameters, or the conversion of the one or more control parameters causes adjustment of one or more controllable resources, of the electrical power grid, in accordance with the one or more control parameters.

These and other implementations of the technology disclosed herein can include one or more of the following features.

In some implementations, the first set of one or more endpoints further include one or more additional endpoints that are in addition to the power controller. In some of those implementations, the one or more additional endpoints include a human machine interface (HMI), a historian system, a supervisory control and data acquisition (SCADA) system, an additional universal power system data exchange, and/or one or more other additional applications.

In some implementations, second set of one or more endpoints include the one or more controllable resources and/or one or more additional controllers controlling the one or more controllable resources. In some of those implementations, the second set of one or more endpoints further include a historian system, a supervisory control and data acquisition (SCADA) system, and/or an additional universal power system data exchange.

In some implementations, the synchronized timestamp is synchronized to a Global Positioning System (GPS) clock or to a standalone precision clock.

In some implementations, the resource of the electrical power grid is a publisher to the universal power system data exchange but is not a subscriber to any data from the universal power system data exchange. In some of those implementations, the resource of the electrical power grid is a virtual or physical sensor. In some versions of those implementations, the resource is the physical sensor such as a phasor measurement unit (PMU). In some of those versions, the streaming power data measurement is an integer value, the conversion of the streaming power data measurement is a float value, and the conversion of the streaming power data measurement is transmitted to at least some of the first set of one or more endpoints. In some other of those versions, the streaming power data measurement is a float value, the conversion of the streaming power data measurement is an integer value, and the conversion of the streaming power data measurement is transmitted to at least some of the first set of one or more endpoints.

In some implementations, the resource and the power controller lack any direct data communication with one another.

In some implementations, the resource and the first set of one or more endpoints lack any direct data communication with one another.

In some implementations, the power controller and the second set of one or more endpoints lack any direct data communication with one another.

In some implementations, the first set of one or more endpoints lack any direct data communication with the second set of one or more endpoints.

In some implementations, the transmitting and the receiving utilize a streaming protocol, such as the IEEE 2664 Standard.

In some implementations, the conversion of the streaming power data measurement is received and formatted utilizing a Common Information Model (CIM) before transmitting to the first set of one or more endpoints. In some of those implementations, the method further includes utilizing the CIM and the streaming power data measurement to generate the conversion of the streaming power data measurement.

In some implementations, the method further includes, prior to receiving the streaming power data measurement: receiving a request for the power controller to subscribe to streaming power data measurements from the resource; and in response to receiving the request, generating or updating the first subscriber data to include the power controller among the first set of one or more endpoints. In some versions of those implementations, receiving the request and/or generating or updating the first subscriber data is contingent on the request being authenticated. In some of those versions, the method further includes, prior to receiving the request: receiving an initial request; determining, based on the initial request and utilizing a Common Information Model (CIM), the streaming power data measurements for the resource; and providing, in response to the request, an indication of the streaming power data measurements for the resource. In those versions, he request is received in response to providing the indication of the streaming power data measurements for the resource.

In some implementations, the one or more control parameters include set point data. In some of those implementations, the set point data includes a power setpoint, a voltage setpoint, a frequency setpoint, and/or an angle setpoint.

In some implementations, the one or more control parameters include a real and reactive power dispatch signal that is for an electricity generator of the one or more controllable resources or that is for an inverter of the one or more controllable resources.

In some implementations, the communication network comprises or consists of the Internet.

In some implementations, the communication network comprises or consists of a private communication network.

In some implementations, transmitting the streaming power data measurement, or the conversion of the streaming power data measurement, is a push transmitting that occurs independent of any request from the first set of one or more endpoints.

In some implementations, the one or more controllable resources include a real microgrid, a virtual microgrid, a battery, an energy storage unit, a generator, a solar power plant, a wind power plant, an electric vehicle charging system, an air conditioning unit, a washer, a dryer, a refrigerator, and/or a pool pump.

In some implementations, the method further includes receiving, from the resource of and via the communication network, an additional data value. In some of those implementations, the additional data value lacks any timestamp. Put another way, no timestamp for the additional data value is received (or transmitted by the resource).

In some implementations, the resource of the electrical power grid is a subscriber to the universal power system data exchange but is not a publisher to any data from the universal power system data exchange.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers that include one or more processors operable to execute stored instructions to perform a method such as one or more of the methods described herein.

What is claimed is:

1. A method implemented by one or more processors, the method comprising:

receiving, from a resource of an electrical power grid and via a communication network, a streaming power data measurement that includes a synchronized timestamp;

transmitting, via the communication network, the streaming power data measurement, or a conversion of the streaming power data measurement that includes the synchronized timestamp, to a first set of one or more endpoints,
wherein transmitting the streaming power data measurement, or the conversion of the streaming power data measurement, is to the first set of one or more endpoints based on first subscriber data reflecting that the first set of one or more endpoints have subscribed to streaming power data measurements from the resource, and
wherein the first set of one or more endpoints include a power controller;

receiving, from the power controller and via the communication network, one or more control parameters generated by the power controller based on the streaming power data measurement, or the conversion of the streaming power data measurement, wherein the one or more control parameters include the synchronized timestamp of the streaming power data measurement and include the synchronized timestamp based on being generated based on the streaming power data measurement or the conversion of the streaming power data measurement;

transmitting, via the communication network, the one or more control parameters, or a conversion of the one or more control parameters that include the synchronized timestamp, to a second set of one or more endpoints, wherein transmitting the one or more control parameters, or the conversion of the one or more control parameters, to the second set of one or more endpoints is based on second subscriber data reflecting that the second set of one or more endpoints have subscribed to control parameters generated by the power controller, wherein transmitting the one or more control parameters, or the conversion of the one or more control parameters causes adjustment of one or more controllable resources, of the electrical power grid, in accordance with the one or more control parameters;

wherein the second set of one or more endpoints include the one or more controllable resources and/or one or more additional controllers controlling the one or more controllable resources, and wherein the second set of one or more endpoints further include a historian system, a supervisory control and data acquisition (SCADA) system, and/or an additional universal power system data exchange.

2. The method of claim 1, wherein the first set of one or more endpoints further include one or more additional endpoints that are in addition to the power controller.

3. The method of claim 2, wherein the one or more additional endpoints include a human machine interface (HMI) and/or an additional application.

4. The method of claim 1, wherein the synchronized timestamp is synchronized to a Global Positioning System (GPS) clock or to a standalone precision clock.

5. The method of claim 1, wherein the resource of the electrical power grid is a publisher to the universal power system data exchange but is not a subscriber to any data from the universal power system data exchange.

6. The method of claim 5, wherein the resource of the electrical power grid is a virtual or physical sensor.

7. The method of claim 6, wherein the resource is the physical sensor and wherein the physical sensor is a phasor measurement unit (PMU).

8. The method of claim 7, wherein the streaming power data measurement is one of an integer value and a float value, the conversion of the streaming power data measurement is the other of the integer value and the float value, and wherein the conversion of the streaming power data measurement is transmitted to at least some of the first set of one or more endpoints.

9. The method of claim 1, where the resource and the power controller lack any direct data communication with one another.

10. The method of claim 1, wherein the resource and the first set of one or more endpoints lack any direct data communication with one another.

11. The method of claim 1, wherein the power controller and the second set of one or more endpoints lack any direct data communication with one another.

12. The method of claim 1, wherein the first set of one or more endpoints lack any direct data communication with the second set of one or more endpoints.

13. The method of claim 1, where the transmitting and the receiving utilize a streaming protocol.

14. The method of claim 13, wherein the streaming protocol is the IEEE 2664 Standard.

15. The method of claim 1, wherein the conversion of the streaming power data measurement is received and formatted utilizing a Common Information Model (CIM) before transmitting to the first set of one or more endpoints.

16. The method of claim 15, further comprising utilizing the CIM and the streaming power data measurement to generate the conversion of the streaming power data measurement.

17. The method of claim 1, further comprising, prior to receiving the streaming power data measurement:
receiving a request for the power controller to subscribe to streaming power data measurements from the resource; and
in response to receiving the request, generating or updating the first subscriber data to include the power controller among the first set of one or more endpoints.

18. The method of claim 17, wherein receiving the request and/or generating or updating the first subscriber data is contingent on the request being authenticated.

19. The method of claim 17, further comprising, prior to receiving the request:
receiving an initial request;
determining, based on the initial request and utilizing a Common Information Model (CIM), the streaming power data measurements for the resource; and
providing, in response to the request, an indication of the streaming power data measurements for the resource, wherein the request is received in response to providing the indication of the streaming power data measurements for the resource.

20. The method of claim 1, wherein the one or more control parameters include set point data.

21. The method of claim 20, wherein the set point data includes a power setpoint, a voltage setpoint, a frequency setpoint, and/or an angle setpoint.

22. The method of claim 1, wherein the one or more control parameters include a real and reactive power dispatch signal that is for an electricity generator of the one or more controllable resources or that is for an inverter of the one or more controllable resources.

23. The method of claim 1, wherein the communication network comprises the Internet.

24. The method of claim 1, wherein the communication network comprises a private communication network.

25. The method of claim 1, wherein transmitting the streaming power data measurement, or the conversion of the streaming power data measurement, is a push transmitting that occurs independent of any request from the first set of one or more endpoints.

26. The method of claim 1, wherein the one or more controllable resources include:
a real microgrid,
a virtual microgrid,
a battery,
an energy storage unit,
a generator,
a solar power plant,
a wind power plant,
an electric vehicle charging system,
an air conditioning unit,
a washer,
a dryer,
a refrigerator, and/or
a pool pump.

27. The method of claim 1, further comprising receiving, from the resource of and via the communication network, an additional data value.

28. The method of claim 27, wherein the additional data value lacks any timestamp.

29. The method of claim 1, wherein the resource of the electrical power grid is a subscriber to the universal power system data exchange but is not a publisher to any data from the universal power system data exchange.

30. A system, comprising:
 memory storing instructions;
 one or more processors operable to execute the instructions to:
 receive, from a resource of an electrical power grid and via a public communication network, a streaming power data measurement that includes a synchronized timestamp;
 transmit, via the public communication network, the streaming power data measurement, or a conversion of the streaming power data measurement that includes the synchronized timestamp, to a first set of one or more endpoints,
  wherein transmitting the streaming power data measurement, or the conversion of the streaming power data measurement, is to the first set of one more endpoints based on first subscriber data reflecting that the first set of one or more endpoints have subscribed to streaming power data measurements from the resource, and
  wherein the first set of one or more endpoints include a power controller;
 receive, from the power controller and via the public communication network, one or more control parameters generated by the power controller based on the streaming power data measurement, or the conversion of the streaming power data measurement, wherein the one or more control parameters include the synchronized timestamp of the streaming power data measurement based on being generated based on the streaming power data measurement or the streaming power data measurement;
 transmit, via the public communication network, the one or more control parameters, or a conversion of the one or more control parameters that include the synchronized timestamp, to a second set of one or more endpoints,
  wherein transmitting the one or more control parameters, or the conversion of the one or more control parameters, is to the second set of one or more endpoints is based on second subscriber data reflecting that the second set of one or more endpoints have subscribed to control parameters generated by the power controller,
  wherein transmitting the one or more control parameters, or the conversion of the one or more control parameters causes adjustment of one or more controllable resources, of the electrical power grid, in accordance with the one or more control parameters;
  wherein the second set of one or more endpoints include the one or more controllable resources and/or one or more additional controllers controlling the one or more controllable resources, and
  wherein the second set of one or more endpoints further include a historian system, a supervisory control and data acquisition (SCADA) system, and/or an additional universal power system data exchange.

* * * * *